(12) United States Patent
Blicker et al.

(10) Patent No.: US 7,770,216 B2
(45) Date of Patent: Aug. 3, 2010

(54) TRANSPARENT ACCESS AUTHENTICATION IN GPRS CORE NETWORKS

(75) Inventors: Stephan Blicker, Wachtberg-Villip (DE); Matthias Britsch, Konigswinter (DE)

(73) Assignee: T-Mobile Deutschland GmbH, Bonn (DE)

( * ) Notice: Subject to any disclaimer, the term of this patent is extended or adjusted under 35 U.S.C. 154(b) by 694 days.

(21) Appl. No.: 10/566,584

(22) PCT Filed: Jul. 30, 2004

(86) PCT No.: PCT/EP2004/008574

§ 371 (c)(1),
(2), (4) Date: Jan. 31, 2006

(87) PCT Pub. No.: WO2005/015875

PCT Pub. Date: Feb. 17, 2005

(65) Prior Publication Data

US 2006/0195898 A1     Aug. 31, 2006

(30) Foreign Application Priority Data

Jul. 31, 2003 (EP) .................. 03017348

(51) Int. Cl.
*G06F 9/00* (2006.01)
*G06F 15/16* (2006.01)
*G06F 17/00* (2006.01)

(52) U.S. Cl. .................. 726/12; 726/3; 726/5; 726/11

(58) Field of Classification Search .......... 726/12, 726/22–33, 2–8; 370/349; 713/150, 153–154, 713/168–174, 182–186, 202; 709/249, 246–247, 709/229, 225

See application file for complete search history.

(56) References Cited

U.S. PATENT DOCUMENTS

| 6,678,517 | B2 * | 1/2004 | Naim et al. ............. 455/414.1 |
| 6,977,917 | B2 * | 12/2005 | Skog et al. ............. 370/349 |
| 7,155,526 | B2 * | 12/2006 | Chaudhary et al. ...... 709/229 |

(Continued)

FOREIGN PATENT DOCUMENTS

WO     WO 02/32165 A1     4/2002

(Continued)

OTHER PUBLICATIONS

3rd Generation Partnership Project; Technical Specification Group Services and System Aspects; 3G Security; Access security for IP-based services (Release 5); XP-002264085; V5.6.0, Jun. 2003, pp. 1-27,34-40.

*Primary Examiner*—Emmanuel L Moise
*Assistant Examiner*—Jing Sims
(74) *Attorney, Agent, or Firm*—Browdy and Neimark, PLLC

(57) ABSTRACT

The present invention relates to a method for application layer authentication of subscribers connected to the authenticating network domain by a 2G or 2.5G GPRS core network or a 3G UMTS network, characterised by using data which are assembled by the network layer during establishment of a PDP context in GPRS networks. The invention comprises System of units in a mobile telecommunication network, including at least a first authentication unit which is connected via a data line to a second unit which assembles data according to the described method.

15 Claims, 2 Drawing Sheets

U.S. PATENT DOCUMENTS

| | | | |
|---|---|---|---|
| 2003/0154400 A1* | 8/2003 | Pirttimaa et al. | 713/201 |
| 2004/0085949 A1* | 5/2004 | Partanen et al. | 370/352 |
| 2004/0136398 A1* | 7/2004 | Enzmann et al. | 370/465 |
| 2004/0148416 A1* | 7/2004 | Aarnos et al. | 709/230 |
| 2004/0153667 A1* | 8/2004 | Kastelewicz et al. | 713/201 |

FOREIGN PATENT DOCUMENTS

| | | |
|---|---|---|
| WO | WO 2004/019641 A1 | 3/2004 |

* cited by examiner

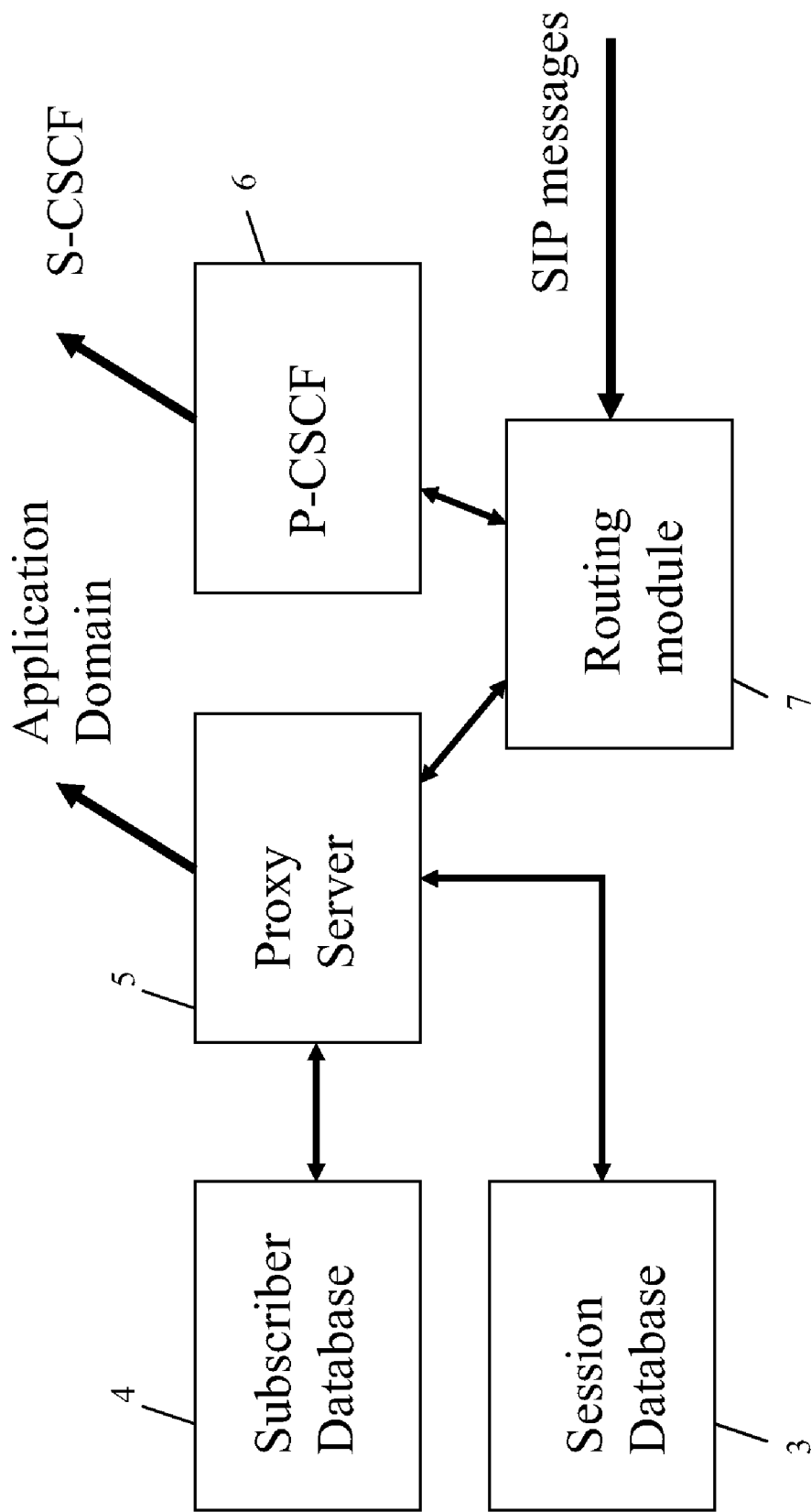

TRANSPARENT ACCESS AUTHENTICATION IN GPRS CORE NETWORKS

BACKGROUND OF THE INVENTION

The present invention relates to a method and system for transparent access authentication in 2G and 2.5G Mobile Access Networks. This includes communication networks of the GSM-, GPRS- and UMTS-standard well known to skilled persons.

In standardisation of Universal Mobile Telecommunication System (UMTS Rel.5) comprehensive means are foreseen to perform authentication on the application layer with no need to interwork with the underlying radio and transport networks. The mechanisms are based on the assumption that a specific environment is prepared, for deployment of IP Multimedia Subsystem (IMS) services. It includes the use of IMS SIM (ISIM) application, which in turn requires Rel. 99UICC's in the connected end devices to handle the authentication and key agreement (AKA).

In case of deployment of IMS and IMS based services in a network environment which is characterised by the use of SIM cards, the standardised authentication mechanism will not be applicable.

BRIEF SUMMARY OF THE INVENTION

It is the object of the invention to provide method and system for transparent access authentication which allow it to run authentication transparently to the end device, without requiring proprietary extensions and functions on network or client side.

This object is achieved by providing a method and system as described in the independent claims.

Other features which are considered to be characteristic for the invention are set forth in the dependent claims.

The present invention describes a method for application layer authentication of subscribers, connected to the authenticating network domain by a 2G or 2.5G General Packet Radio Service (GPRS) core network or a 3G UMTS network. The authentication will be based on data which is assembled by the network layer during establishment of a PDP context in GPRS networks. This information is secured by standard SIM card application. As the same mechanisms are used for authentication in 3G networks, the further described mechanism is also applicable there. No standard would be touched in any way while using a 2G or 2.5G access network, because no authentication on application layer is foreseen in the standard. For UMTS Rel.5 standards and following, the standard foresees specific methods. The use of the further described method would be possible, although the standardised authentication mechanism needs to be switched off. Switching off the standardised authentication mechanism could be interpreted as standard sensitive, but subsequent use of the further described mechanism would be standard compliant again.

Further, a migration path to UMTS Rel.5 standardised authentication and the concept for parallel use of both mechanisms is described.

The invention will now be described in further detail with reference to the drawings.

BRIEF DESCRIPTION OF THE DRAWINGS

FIG. 2 depicts an embodiment of the invention with migration to IMS compliant architecture.

DETAILED DESCRIPTION OF EXAMPLE EMBODIMENTS

Figure 1:
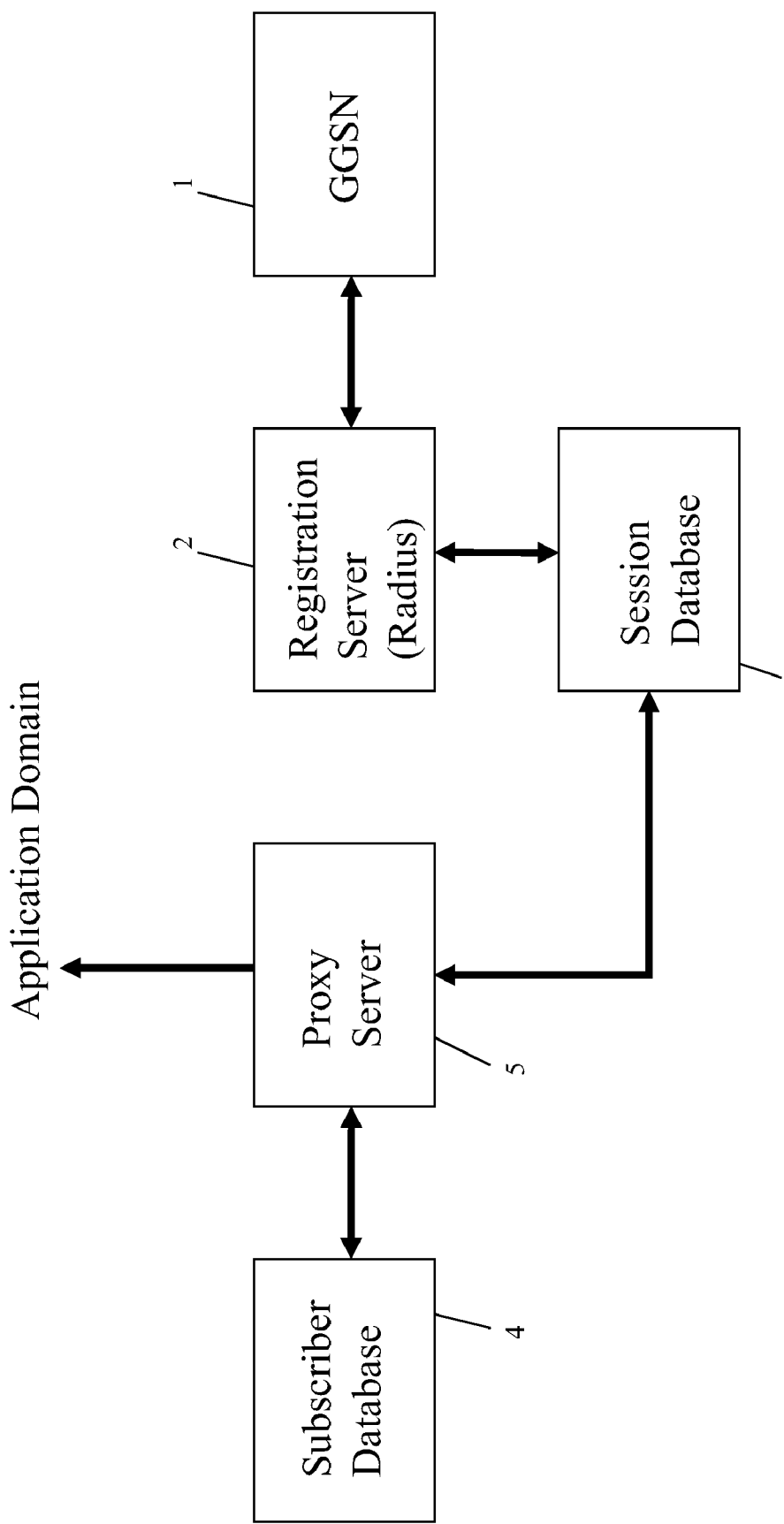
FIG. 1 depicts the general architecture of the system for carrying out the invention.

With reference to FIG. 1, during PDP context establishment the Serving GPRS Support Node (SGSN) is authenticating the subscriber using the A3/A8 algorithm based on the end devices SIM card in case of GSM and 2.5G GPRS and EDGE access network.

The Gateway GPRS Support Node 1 (GGSN) receives a context creation request and queries a Radius (Registration) server 2 (Remote Authentification Dial-In User Service) to get an IP address assigned for the particular PDP context. Within the context the Radius server 2 receives the MSISDN and/or the IMSI of the subscriber. So in the session database 3 of the Radius server 2 there is stored for each PDP context a pair of IP address and IMSI/MSISDN. Based on the tunnel endpoint ID (TEID) the GGSN 1 filters all packets running through the PDP context once established, for the correct IP source address. This means the GGSN 1 checks matching TEID/IP address pairs, thus preventing falsification of source addresses and so called "IP spoofing" for the complete lifecycle of the PDP context. The TEID unambiguously identifies a tunnel endpoint in, the receiving GTP-U (GPRS Tunnelling Protocol—User) or GTP-C (GPRS Tunnelling Protocol—Control) protocol entity. The receiving side of a GTP tunnel locally as signs the TEID value for the transmitting side to use. The TEID values are exchanged between tunnel endpoints using GTP-C messages (or RANAP (Radio Access Network Application Part) in the UTRAN (UMTS Terrestrial Radio Access Network)).

In the application domain a subscriber database 4 exists that stores all PubIDs the subscriber is using in the domain, referring it to his PrivID, which is unique in the respective application domain. The PrivID is correlated with an MSISDN and/or IMSI.

In the request the user gives his PrivID for registration. Upon receiving the registration request, the registration proxy 5 queries the subscriber database 4 containing the subscribers IDs (both public and private) together with the MSISDN/IMSI. This data is stored in a table on the proxy server platform.

Subsequently the proxy server 5 queries the session database 3 of the Radius server 2 in order to get the assigned IP address of that session and the IMSI/MSISDN already authenticated by the network's Home Location Register (HLR). The authentication of the HLR guarantees further that the IP address can be considered to be authenticated as well. Also this information is stored in the table on the proxy server platform.

Now the proxy server 5 starts the authentication procedure according to the invention.

First, the proxy server 5 checks IMSI/MSISDN from Radius server 2 database 3 and application domain database 4 for match. If the pairs are not matching, the subscriber has tried to register with an incorrect PrivID, which is not correlated with his IMSI/MSISDN, if the pairs are matching the next step is performed.

Second step is checking the subscribers IP address in the IP network layer, meaning in the IP packet overhead field for source address for match with the IP address assigned by the Radius server 3. As the IP address was assigned to an IMSI/MSISDN-authenticated session, also the IP address can be considered as authenticated.

If the pairs are not matching, the subscriber used an incorrect IP address, if the pairs are matching the subsequent step is performed.

The proxy server 5 parses the application layer for IP addresses given in the headers of e.g. SIP registration message, SDP message bodies, etc and checks for match with the IP address in, which was already checked for match with the IP address assigned by the Radius server 2. If the pairs are not matching the subscriber used incorrect signalling information, e.g. response addresses, etc. If the pairs are matching, the session setup can be considered as authenticated.

In all subsequent messages arriving at the proxy server 5, it checks for match of IP address in the IP packet overhead field for source address with that in the application layer protocol header fields and verifies the matching pairs against the IP address assigned by the Radius server 2. If PubIDs are used in the following session, the PubIDs are checked against the PrivID which was stored in a table on the proxy server platform after querying the application domains database 4.

The described functionality gives the network operator the opportunity to run authentication transparently to the end device, without requiring proprietary extensions and functions on network or client side. In case of SIP based signalling, the migration to fully standard compliant UMTS Rel.5 mechanisms and a strategy for parallel operation is necessary, this will be described now.

As the IMS domain as standardised for UMTS Rel.5 will include its own authentication mechanism, it is necessary to support a scenario where the subscribers are migrating to ISIM enabled end devices. To exploit the benefits of the standardised authentication mechanism, both mechanisms have to be supported in parallel.

This is done by an additional function that checks each incoming signalling message, first for the protocol, if it is any other protocol than SIP, the session is routed to the proxy server 5.

With reference to FIG. 2, the same routing decision is taken if the message is based on SIP but the client does not support standardised UMTS Rel.5 authentication. If the client does support standardised authentication method, e.g. is ISIM enabled, the message is routed to the standard compliant Proxy Call State Control Function (P-CSCF). First trigger for routing decisions is the protocol type, as described above. Further triggers could be the key exchange mechanism used for setting up the secured connection between UE and P-CSCF (if the end device is starting key agreement, it can be considered as standard compliant and the request is routed to the P-GSCF), or other elements included in the UMTS Rel.5 header as well as any private extension, which is, however, possible but not necessary. If trigger points available in signalling should be insufficient, also database lookups can be used to base routing decisions on.

The authentication procedure is as follows

First, a decision is required by which node P-CSCF 6 or proxy server 5 the register shall be routed For this, a routing module 7 is provided which will be the standard entry point for all messages. The routing module 7 decides by evaluation of PrivID which node will handle the message. The routing module 7 refers to subdomains (e.g. user@gprs.tmo.de and user@tmo.umts.de) within the domain part of the Network Access Identifier (NAI), see 3GPP specification 23.228. This requires that NAIs for 3G subscribers have to provide subdomains.

The routing module 7 shall set a routing entry, by using only the PrivID, subsequent messages shall be identified by the IP source address listed in the routing table.

The routing module 7 identifies the responsible proxy function, i.e. proxy server 5 or P-CSCF 6, by evaluating the PrivID (URIs subdomains) This rises the request towards IMSI/MSISDN and URIs to be chosen according to this functionality.

In case other protocols shall be used beside SIP, such as e.g. SMTP, HTTP, SOAP (.NET), etc, the proxy server 5 must be extended, and authenticate the subscribers by use of the IP address, subsequently resolving the IMSI/MSISDN and matching of the particular identifier of the protocol, which is stored in the subscriber profile of the subscriber database 4. This requires the population of the subscriber profile with the required data elements and extension of the routing module to enable protocol dependent routing.

In case separate access networks are used, the application platform has to know which type of access network is used to adapt service delivery accordingly. This requires that a change request has to be stated against the SGSN to enable it to send the access type to the GGSN which includes it in the radius request, so the access network type will be available in the session database 3. This enables all applications to request the access network type and use it, e.g. for Quality of Service (QoS) means.

Abbreviations
2.5G second and half generation (e.g. GPRS, EDGE)
2G second generation (e.g. GSM)
3G third generation (e.g. UMTS)
AKA authentication and key agreement
CC Circuit Switched
IMS IP multimedia subsystem
IMSI International Mobile Subscriber Identity
ISIM IMS SIM
MSISDN Mobile Station ISDN Number
NAI Network Access Identifier
P-CSCF Proxy-Call-State-Control-Function
SIM (card) (GSM) Subscriber Identity Module (card)
SIP Session Initiation Protocol
TEID Tunnel Endpoint ID
UE User Equipment
UICC UMTS IC Card
UMTS Universal mobile telecommunication system
URI Uniform Ressource Locator

The invention claimed is:

1. A method for transparent access authentication of subscribers connected to an authenticating network domain by a General Packet Radio Service GPRS core network or an Universal Mobile Telecommunication System UMTS network, comprising:

receiving a context creation request from a subscriber;
assigning an IP address to the context creation request;
receiving a check-in ID from the subscriber;
receiving a private identification PrivID from the subscriber, the PrivID being correlated with a pre-recorded ID of the subscriber and stored together in a subscriber database;
comparing the check-in ID with the pre-recorded ID;
authenticating the subscriber when the check-in ID matches the pre-recorded ID;
providing a routing module (7) as a standard entry point for all messages and deciding, in the routing module (7), by evaluation of the PrivID, which network node will handle the message, wherein when a protocol other than Session Initiated Protocol SIP is found, the message is routed to a proxy server.

2. The method according to claim 1, wherein the step of authenticating the subscriber includes, in a Serving GPRS Support Node, using an A3/A8 algorithm based on a SIM card in an end device.

3. The method according to claim 1, further includes:
using a Gateway GPRS Support Node to receive the context creation request;
querying the context creation request to a Radius server;
using the Radius server to receive the check-in ID; and
storing the IP address and the check-in ID in a session database.

4. The method according to claim 1, further includes:
using a proxy server comparing the check-in ID with the pre-recorded ID, wherein the subscriber database is an application domain database.

5. The method according to claim 1, further includes:
using a proxy server to compare a subscriber's IP address in an IP network layer with the assigned IP address for match.

6. The method according to claim 1, further includes:
using a proxy server to parse an application layer for IP addresses given in headers of registration messages and to compare with the assigned IP address for match, the IP address given in the headers having already been checked for matches with the assigned IP address.

7. The method according to claim 1, further comprising in all subsequent messages arriving at the proxy server (5), checking for matches of an IP address in the IP packet overhead field for source address with an IP address in the application layer protocol header fields and verifying the matching pairs against the IP address assigned by the Radius server.

8. A system of units in a mobile telecommunication network, comprising:
at least a first authentication unit connected to a session database via a first data line; and
a second unit connected to the session database via a second data line;
wherein the second unit performs the transparent access authentication according to the method of claim 1.

9. The system of units according to claim 8, wherein said at least first authentication unit comprises a registration server.

10. The system of units according to claim 8, wherein the second unit comprises a proxy server.

11. The system of units according to claim 8, wherein the second unit comprises a proxy server connected to a Proxy Call State Control Function via a routing module.

12. The system of units according to claim 11, wherein the second unit is connected to a subscriber database.

13. The system of units according to claim 11, wherein a routing module selects messages from one of the proxy server and the Proxy Call State Control Function by evaluating the PrivID.

14. The method of claim 1, wherein the check-in ID is one of an Mobile Station ISDN Number MSISDN and/or an International Mobile Subscriber Identity IMSI received from the subscriber, and the pre-recorded ID is one of the subscriber's MSISDN or IMSI pre-recorded in a subscriber database.

15. The system according to claim 10, wherein the proxy server (5) is connected to a subscriber database (4).

* * * * *